United States Patent

[11] 3,630,304

[72] Inventor Yilmaz E. Sahinkaya
Monrovia, Calif.
[21] Appl. No. 880,831
[22] Filed Nov. 28, 1969
[45] Patented Dec. 28, 1971
[73] Assignee The United States of America as
represented by the Administrator of the
National Aeronautics and Space
Administration

[54] OPTIMAL CONTROL SYSTEM FOR AN ELECTRIC MOTOR DRIVEN VEHICLE
14 Claims, 8 Drawing Figs.
[52] U.S. Cl. .................................................. 180/105 E,
123/102, 318/308, 318/327, 318/376
[51] Int. Cl. .................................................. H02p 5/00,
B601 7/12
[50] Field of Search .......................................... 123/102,
97; 318/211, 648, 651, 345; 137/45; 180/105, 105 E

[56] References Cited
UNITED STATES PATENTS
2,450,113  9/1948  Burchett ...................... 137/45 X Primary Examiner—Arthur L. La Point
Assistant Examiner—George H. Libman
Attorneys—John R. Manning, Monte F. Mott and Paul F. McCaul ABSTRACT: Operating conditions experienced by a battery-operated vehicle driven by one or more permanent magnet or separately excited DC motors are sensed and converted into a control signal. The control signal is applied to a pulse width modulator which controls the conduction periods of SCR's in such a way that the average motor armature voltage is proportional to the control signal. In a motoring mode the pulse width modulator operates SCR's to supply current from the battery to the motor armature circuit. This mode usually occurs when the vehicle is moving uphill or accelerating on a level terrain. In a generating mode the pulse width modulator operates SCR's to supply current from the motor armature circuit to the battery. This occurs when the vehicle is moving downhill or is decelerating on a level terrain. The required mode of operation is accomplished automatically by the action of a motor armature current direction sensing circuit.

INVENTOR
YILMAZ E. SAHINKAYA
BY Lindenberg & Freilich
ATTORNEYS

INVENTOR
YILMAZ E. SAHINKAYA
BY Lindenberg & Freilich
ATTORNEYS

OPTIMAL CONTROL SYSTEM FOR AN ELECTRIC MOTOR DRIVEN VEHICLE

ORIGIN OF THE INVENTION

The invention described herein was made in the performance of work under a NASA contract and is subject to the provisions of section 305 of the National Aeronautics and Space Act of 1958, Public Law 85–568 (72 Stat. 435; 42 USC 2457).

BACKGROUND OF THE INVENTION

This invention relates to improvements in electric propulsion vehicle motor control systems and more particularly to improvements therein.

OBJECT AND BRIEF DESCRIPTION OF THE INVENTION

An object of this invention is to provide a speed-controlled operation of a drive motor in such a manner as to produce a minimum energy expenditure during the electrically driven or motoring mode of the motor and a maximum recovery of energy during the generating mode of operation of the motor.

Another object of the invention is the provision of a novel arrangement for controlling the application of voltage to a motor from a battery or the application of voltage from the motor to the battery in response to sensed conditions.

Yet another object of the present invention is the provision of automatically adjustable response time which is the time it takes for the vehicle to accelerate or decelerate to a desired speed setting.

The above objects of the invention are achieved in an arrangement wherein the setting of a throttle establishes a desired speed-setting signal having an amplitude representative of that setting. The output voltage of a tachometer driven in response to the speed of a motor which propels a vehicle, establishes a speed signal having an amplitude representative thereof, which is compared with the desired speed-setting signal and provides a difference signal. As a result of the comparison, either a decelerating circuit is enabled or an accelerating circuit is enabled.

An output representative of the difference signal, is taken from one or the other of these two circuits and is combined with the speed signal from tachometer and the disturbance signal from a terrain slope sensor to provide a control signal. A terrain slope sensor is an arrangement for generating a signal representing terrain slope. The control signal is compared with another output signal of the tachometer, which is representative of motor back e.m.f. voltage, to produce a first or a second turn-on signal. A first turn-on signal is on when the optimal armature voltage is greater than the back e.m.f. voltage. Hence the battery supplies a current to the motor. A second turn-on signal is on when the optimal armature voltage is greater than the back e.m.f. voltage. A second turn-on signal is on when the optimal armature voltage is less than the back e.m.f. voltage. Hence the motor current flows to the battery. The first turn-on signal causes the motoring mode of operation, and the second turn-on signal produces the generating mode of operation. The first turn-on signal turns on a pulse width modulating circuit. The control signal determines the time between turn-on and turnoff pulses from the pulse width modulator. These pulses are used to control the conduction duration of an SCR which applies current from the battery to the motor. The motor accelerates to a desired speed in an automatically adjustable response time. The pulse width modulator operated by the second turn-on signal is automatically disabled. The second turn-on signal, on the other hand, turns on another pulse width modulating circuit. The control signal determines the time between the turn-on and turnoff pulses from the pulse width modulator. These pulses are used to control the conduction duration of an SCR which supplies current from the motor armature circuit to the battery.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
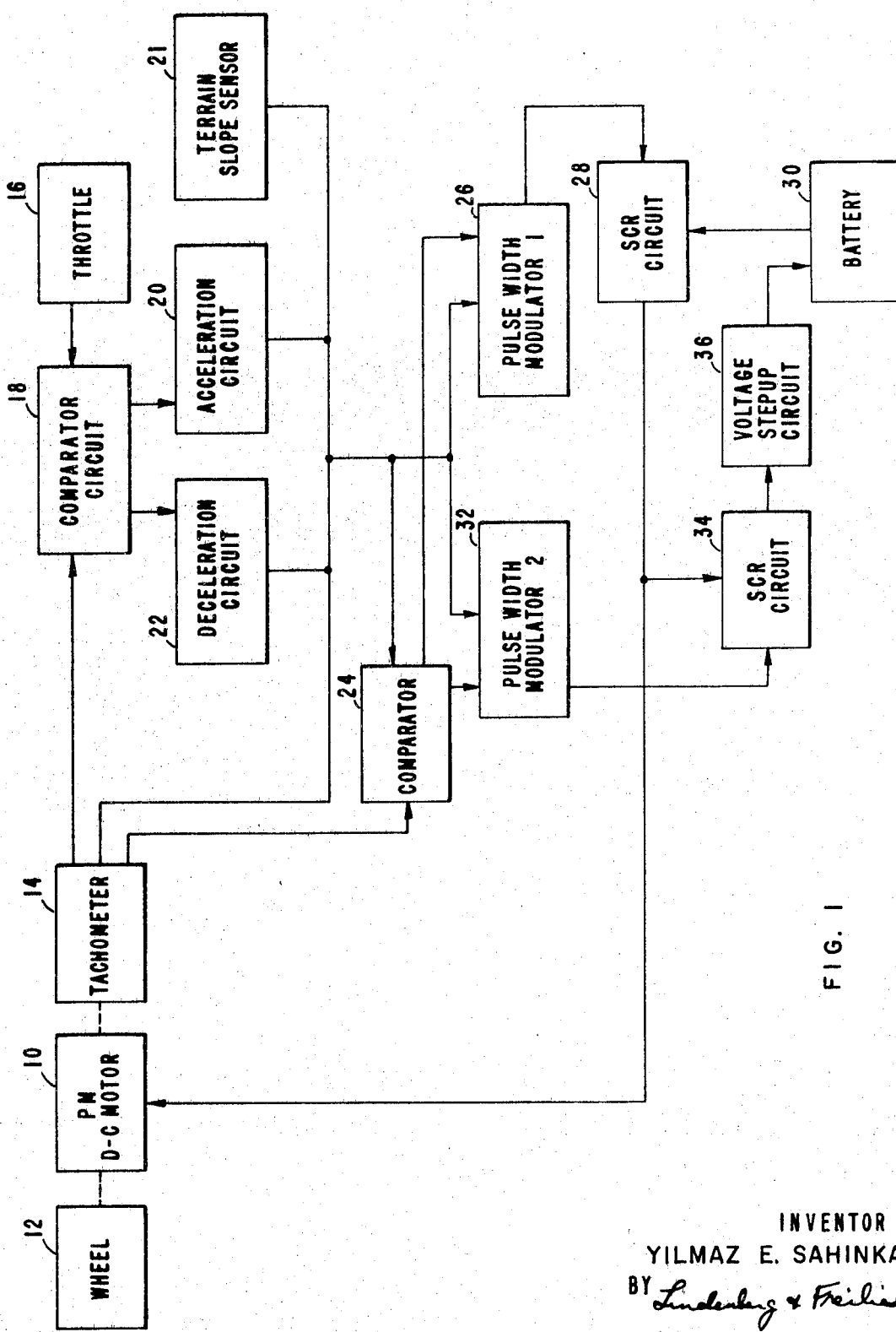
FIG. 1 is a block schematic diagram of an embodiment of the invention.

FIG. 1. Optimal Control System

Referring now to FIG. 1, an electrical motor 10, is coupled, by any suitable means, to a drive wheel 12 of a vehicle. The motor has mechanically coupled thereto a tachometer 14, which is also driven thereby. The tachometer speed representative output voltage is used to drive three separate amplifiers, not shown to provide three isolated outputs. The speed at which it is desired the motor to operate is established by a throttle circuit 16, which as will be subsequently shown need only comprise potentiometer connected into a DC circuit. The voltage output of the throttle circuit, which represents a desired speed, is compared with the voltage output of the tachometer by a comparator circuit 18. If the tachometer output voltage is lower, an acceleration circuit 20 is energized. If the tachometer output voltage is high, a deceleration circuit 22 is energized, the throttle circuit also automatically determines a response time. The acceleration circuit output voltage and the deceleration circuit output voltage comprises the difference between throttle voltage and tachometer voltage.

It should be appreciated that the speed indication provided by the output of the tachometer, when in excess of the voltage established by the throttle may be due not only to more than sufficient electrical drive being applied to the motor but also may be due to terrain conditions such as the vehicle being on a downhill slope or, may be due to the setting of the throttle being reduced for the purpose of reducing speed. In any event, the comparator circuit senses the difference in tachometer and throttle circuit output voltage and causes an energization of either the deceleration circuit or the acceleration circuit in accordance therewith.

The tachometer which is called a control signal, is applied to a second comparator circuit 24, and also to a pulse width modulator circuit 26 and 32.

Another output is taken from the tachometer circuit 14 and applied to the comparator circuit input. The comparator 24 in response to the tachometer assuming the vehicle is on a level terrain turns on pulse width modulator circuit 26. The width of the pulses generated by pulse width modulator circuit 26 is a function of the control signal applied to the input. The conduction period of the SCR circuit 28 varies linearly with the amplitude of the control signal applied to the input of the pulse width modulator.

The SCR circuit 28 passes current from the battery 30 to the motor 10 during the conduction period of the SCR.

Should the motor 10 speed up or should the throttle circuit signal be reduced, so that the tachometer signal, which is applied to the comparator circuit 18, exceeds the output of the throttle circuit 16, the decelerate circuit 22 is energized and the accelerate circuit 20 is deenergized. The decelerate circuit, when energized reduces the output of the tachometer signal by the difference signal or reduces the control signal amplitude below the tachometer signal. In response to this the comparator circuit 24 turns on the pulse width modulator circuit 32 and turns off the pulse width modulator circuit 26. The pulse width modulator circuit 36 produces output pulses in response to the control signal which are used to drive an SCR circuit 34. The SCR circuit 34 is then utilized to pulse width modulate the motor back e.m.f. voltage, and supply a voltage to a voltage step-up circuit 36. This circuit steps up the voltage, which is received, to a value whereby it can be applied to charge the battery 30.

From the foregoing description, it will be appreciated that the system described operates not only to drive the motor at a desired speed, but should the motor speed exceed a desired value, the motor, acting as a generator applies its output to recharge the battery, thus acting as a dynamic brake on the vehicle. A single throttle circuit and a battery system may be employed with the four or more motors required for a four-wheel vehicle, but the remainder of the circuit should be duplicated for each wheel.

Figure 2:
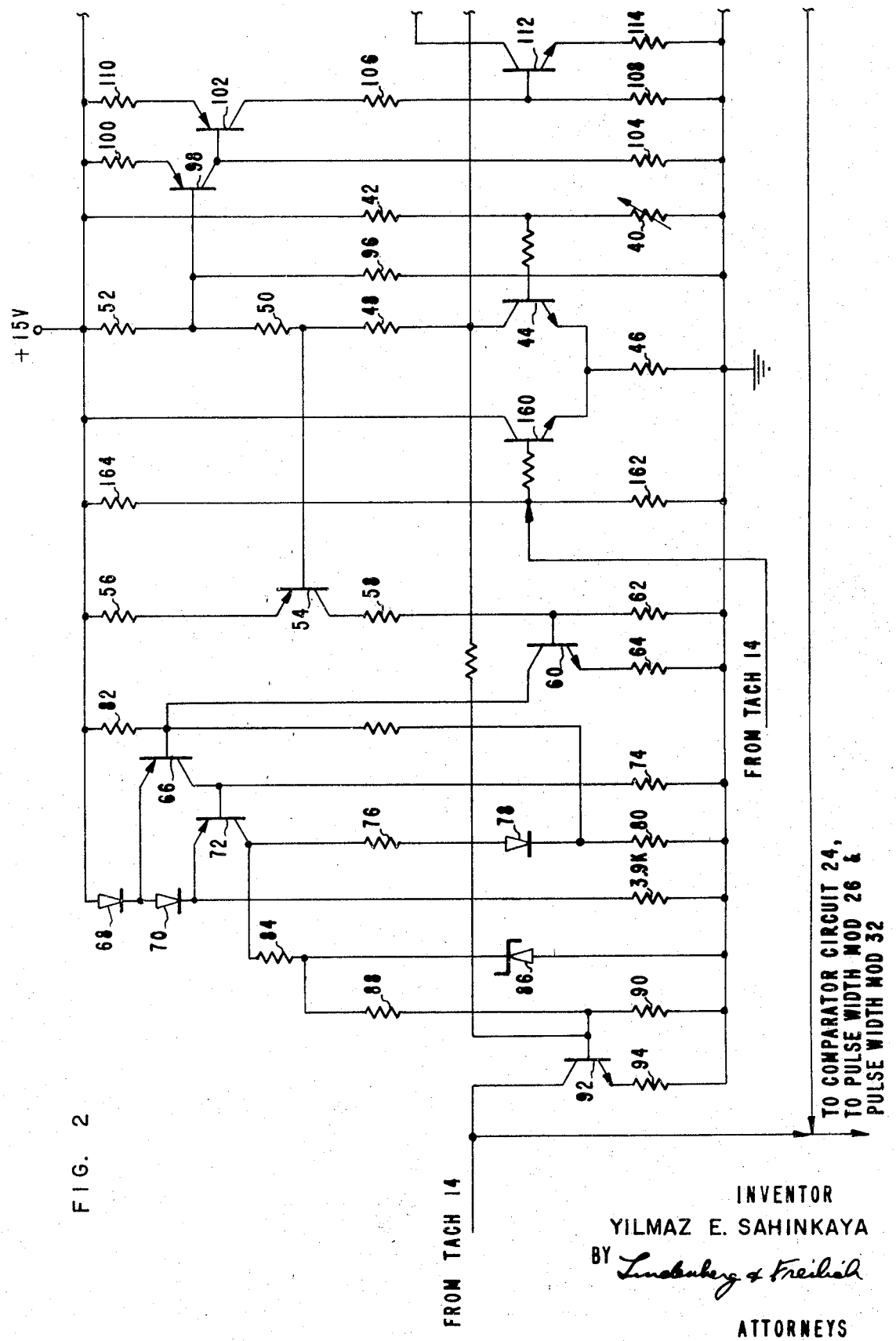
FIGS. 2 and 2A are a circuit diagram of the optimal controller used in the embodiment of the invention.
Figure 2A:
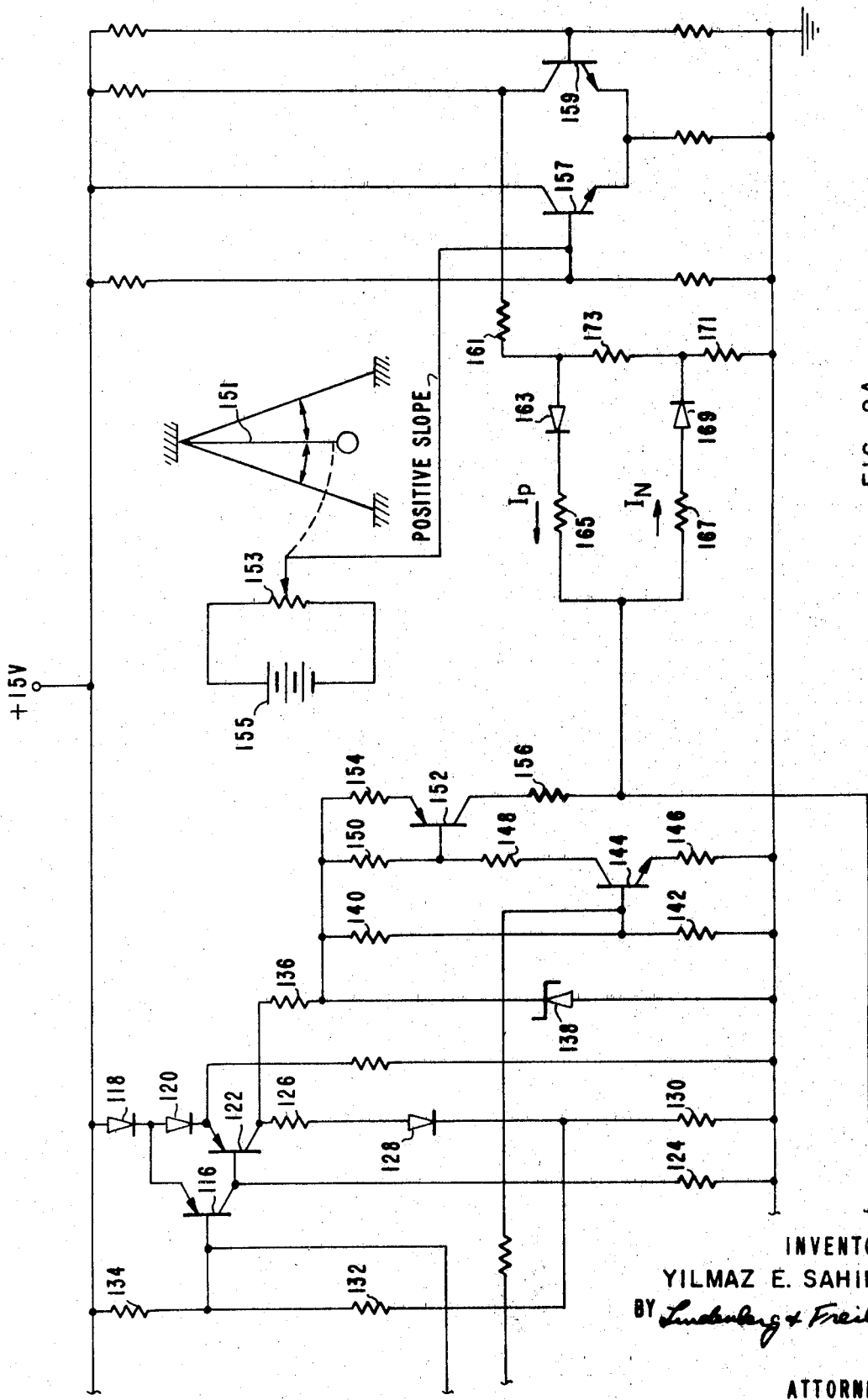

FIGS. 2 and 2A—Optimal Control Circuit

FIGS. 2 and 2A include a schematic diagram of the throttle circuit 16, the comparator circuit 18, the acceleration circuit 20, the deceleration circuit 22 and the terrain sensor. The throttle comprises a potentiometer 40, which is connected in series with a resistor 42, and across a source of operating potential, which by way of example is +15 volts. The throttle potentiometer 40 is connected to the base of a transistor 44. The emitter of transistor 44 is connected to ground to a resistor 46. The collector of transistor 44 is connected to three series resistors respectively 48, 50 and 52. Resistor 52 is connected to the +15 volt terminal of the power supply.

The junction between resistors 48 and 50 is connected to the base of a transistor 54. The emitter of transistor 54 is connected through a resistor 56 to the +15 volt terminal. The collector of transistor 54 is connected through a resistor 58 to the base of another transistor 60, and also through a resistor 62 to ground.

Transistor 60 has its emitter connected through a resistor 64 to ground, and its collector connected to the base of a transistor 66. The emitter of transistor 66 is connected through a diode 68 to the +15 volt terminal, and also through a diode 70 to the emitter of another transistor 72. The base of transistors 72 is connected to the collector of transistor 66 and also is connected through a resistor 74, to ground.

The collector of transistor 72 is connected through a series-connected resistor 76, diode 78, and resistor 80 to ground. The junction of diode 78 and resistor 80 is connected to the base of transistor 66 and through a resistor 82 to the +15 volt terminal. Transistors 66 and 72 and their associated circuit components form a Schmitt trigger circuit.

The collector of transistor 72 is also connected to a resistor 84. Resistor 84 is connected through a zener diode 86 to ground, and also is connected to ground through series-connected resistors respectively 88, and 90. The junction of resistors 88 and 90 are connected to the base of a transistor 92. One output of tachometer 14 is applied to the collector of transistor 92. The emitter of transistor 92 is connected through a resistor 94 to ground. The collector of transistor 44 is connected to the base of transistor 92. This controls the amount of deceleration voltage which is subtracted from the control signal applied to the input of the pulse width modulator.

The junction of resistors 50 and 52 are connected to ground through a resistor 96, and also to the base of a transistor 98. The emitter of transistor 98 is connected to the +15 volt terminal through a resistor 100. The collector of transistor 98 is connected to the base of a transistor 102, and also to ground through a resistor 104. The collector of transistor 102 is connected through two series-connected resistors respectively 106 and 108 to ground. The emitter of transistor 102 is connected through a resistor 110 to the +15 volt terminal.

The junction of resistors 106 and 108 are connected to the base of a transistor 112. The emitter of transistor 112 is connected through a resistor 114 to ground. The collector of transistor 112 is connected to the base of a transistor 116. The emitter of transistor 116 is connected through a diode 118 to the +15 volt terminal. The emitter is also connected through a diode 120 to the emitter of another transistor 122. The collector of transistor 116 is connected to the base of transistor 122, and also through a resistor 124 to ground. Transistors 116 and 122 together with their associated circuit components form a Schmitt trigger circuit.

The collector of transistor 122 is connected through series-connected resistor 126, and diode 128, and resistor 130 to ground. The junction between diode 128 and resistor 130 is connected through a resistor 132 to the base of transistor 116 and also through a resistor 134 to the 15 volt terminal.

The collector of transistor 122 is connected to a resistor 136. The other end of resistor 136 is connected through a zener diode 138 to ground, and also through a resistor 140 and the resistor 142 to ground. The junction of resistors 140 and 142 is connected to the base of a transistor 144. Also the collector of transistor 44 is connected to the base of transistor 144. The emitter of transistor 144 is connected through a resistor 146 to ground. The collector of transistor 144 is connected through two series-connected resistors 148 and 150 to the 15 volt terminal. The junction of resistors 148 and 150 is connected to the base of a transistor 152. The emitter of transistor 152 is connected through a resistor 154 to resistor 200. The collector of transistor 152 is connected through a resistor 156 to the output of tachometer 14 and to the input circuit of pulse width modulator 26. The output from the terrain slope sensor 21 is also connected to the collector of transistor 152. The resulting signal determines the amount of acceleration voltage to be added to the input circuit of pulse width modulator.

Transistors 160 and 44 and their associated circuit components comprise a difference circuit wherein the conductive state of transistor 44 is determined by the difference in the amplitudes of the tachometer signal applied to the base of transistor 160 and the throttle signal applied to the base of transistor 44. Should throttle signal exceed tachometer signal then transistor 102 is cut off causing transistor 112 to turn off which drives the Schmitt trigger circuit made up of transistors 116, 122 to the set state. The output from transistor 122 applies operating potential to transistors 144 and 152. Transistor 144 amplifies the voltage difference signal received from the collector of transistor 44. The output of transistor 144 drives transistor 152 causing it to draw current accordingly, which current is applied to the input circuit of the pulse width modulator.

Should the tachometer signal amplitude exceed the throttle signal, the collector output of transistor 44 decreases which enables transistor 54 to be made nonconductive. This turns off transistor 60 which then drives the Schmitt trigger circuit comprising transistors 66 and 72 to its set state. This enables transistor 92 to conduct in accordance with the amplitude of the difference signal which is also applied to its base. Since the collector of transistor 92 is connected to the pulse width modulator input line, transistor 92 conducts current from, or subtracts current from the control signal.

There is a "dead zone" or region between acceleration and deceleration in which, despite a change in the conductive state of transistor 44 there is no change in either the acceleration or the deceleration circuitry, depending upon which of the two is on at the time. This "dead zone" is used to avoid oscillation between the two. It is achieved by the presence of resistor 50, which requires a pronounced change in the conductive state of transistor 44 or a set function occurring in the current drawn in order that a switch may be made from accelerate to decelerate state or vice versa. When the speed indicating voltage output of tachometer 14 is equal to the voltage representative of the desired speed, as established by the voltage at the potentiometer 40, then, neither the acceleration of the deceleration circuits are energized, the transistor 44 being held substantially nonconductive.

In FIG. 2A there is an illustration of a terrain slope measuring device which can be employed with this invention. It includes a slope sensor 151, which is a pendulum which determines the front-to-back attitude of the vehicle on which it is mounted, and thereby the slope of the terrain. The pendulum moves the movable arm of a potentiometer 153, to which it is suitably mechanically coupled, to a position along the resistor, which corresponds to the pendulum position relative to the horizontal position.

The potentiometer 153 is connected across a potential source 155, so that the potential on the potentiometer movable arm is representative of the terrain slope. The signal from the potentiometer is applied to the base of a transistor 157. This transistor, together with a transistor 159, are connected to form a difference amplifier in the manner of transistors 44 and 160 in FIG. 2. Transistor 159 has a fixed bias applied to its base. Output is taken from the collector of transistor 159 and is applied through a coupling network, including series-connected resistor 161, diode 163 and resistor 165, to a junction point at resistor 156 in FIG. 2. Also connected to the junction point at resistor 156 in FIG. 2 are series-connected resistor 167, diode 169, and resistor 171 which is connected to ground. Resistors 161 and 171 are separated by a resistor 173.

In operation, if the vehicle, in which the equipment indicated is installed, is moving uphill, the potential applied to the base of transistor 157 is more positive than when the vehicle moves on a level. This makes the emitter of transistor 157 more positive which causes a reduction in the conduction of transistor 159 with a consequent increase in collector potential. This can cause a current to flow through resistor 161, diode 163, resistor 165, to join with the output of the acceleration circuit or deceleration circuit, depending upon the potential at the junction with resistor 156 in FIG. 2. If the vehicle is moving downhill then the potential applied to the base of transistor 157 is less positive than when the vehicle is on a level. The emitter of transistor 157 is less positive resulting in an increased current flow through transistor 159, with a consequent drop in collector potential. This drop may enable diode 163 to be blocked and current to flow from the junction point at resistor 152, through resistor 167, diode 169, and resistor 171 to ground.

From the foregoing description it should now be understood how the control signal for the vehicle motors takes into consideration the selected speed and the actual speed as modified by the terrain slope. The contribution of the terrain slope sensor to the control signal is to modify it to take into consideration the effect of the terrain slope so that the speed of the vehicle will be maintained at the selected value.

Figure 3:
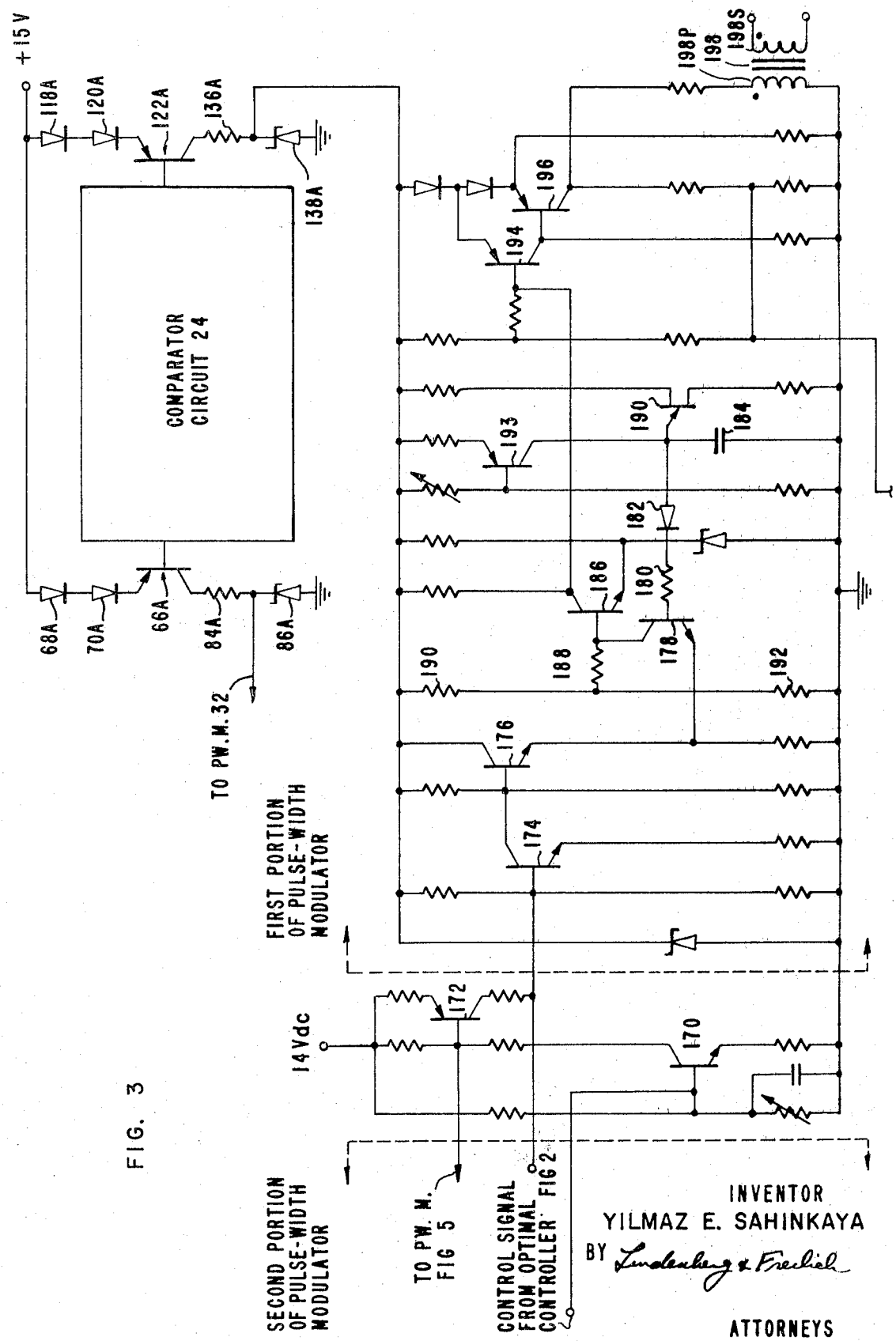
FIGS. 3 and 3A are a circuit diagram of a pulse width modulator which is employed in the embodiment of the invention.
Figure 3A:
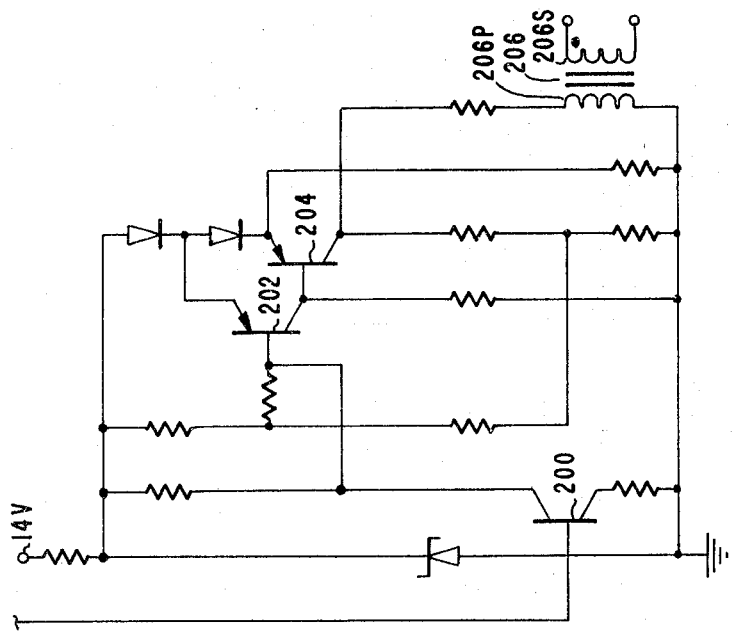

FIG. 3A Pulse Width Modulator Circuit 26 and Comparator Circuit 24

FIGS. 3 and 3A are a circuit diagram of the pulse width modulator circuit 26. Comparator circuit 24 which energizes pulse width modulator circuit 26 or pulse width modulator circuit 32, has the same circuit diagram as is shown in FIG. 2 comprising the difference circuit which drives one or the other of the two Schmitt trigger circuits. In comparator circuit 24, however, transistor 92 is omitted, as are transistors 144, and 152, and their associated resistors and connections. Output is taken for turning on the pulse width modulator circuit 26 from the junction of the resistor and zener diode corresponding to resistor 136 and zener 138. Output is taken for turning on the pulse width modulator circuit 32, from the junction of the resistor corresponding to resistor 84 and corresponding to the zener diode 86.

For the purpose of identification, the transistors and zener diode in the output portion of the Schmitt triggers in the comparator circuit 24, corresponding to those in the comparator circuit 18, are given the same reference numerals except that they have had the letter *a* added thereto.

It was previously pointed out that the control signal determined the conduction periods of the SCR's in the SCR circuits 28 and 34. The one of the two pulse width modulator circuits which is energized to drive the SCR circuits is determined by the need for acceleration or deceleration is determined by comparator circuit 18 output as modified by terrain slope signals. The comparator circuit 24 operates to turn on either the pulse width modulator circuit 26 or the pulse width modulator circuit 32 by turning on the operating potential of one circuit and turning off the operating potential of the other circuit. This is accomplished by the Schmitt trigger circuits which are in the output of the comparator circuit 24.

The output from the comparator circuit 24 taken across the zener diode 138A provides a 10 volt potential, which is applied across the pulse width modulator circuit 26. This occurs only when the control signal exceeds the speed signal from the tachometer indicating a motoring operation is called for.

The pulse width modulator command signal is applied to the base of a transistor 170. The current drawn by transistor 170 in response to the signal applied to its base provides a bias level which is linearly proportional to its input signal. The output of transistor 170 is applied through successive transistor amplifiers 172, 174, and 176, to the emitter of a transistor 178. The base of transistor 178 is connected through series-connected resistor 180 and diode 182, to one side of a capacitor 184. The other side of the capacitor 184 is connected to ground. The collector of transistor 178 is connected to the base of a transistor 186. A bias is also applied to the base of transistor 186 through a resistor 188, which is connected to the junction of series-connected resistors 190 and 192. The series-connected resistors are connected across the source of operating potential, when it is applied thereto from the comparator circuit 24.

Capacitor 184 unijunction transistor 190, and transistor 193, form the classical circuit of a sawtooth waveform generator wherein the transistor 193 serves as a constant current source for applying current to charge up capacitor 184. The unijunction 190, when the voltage across the capacitor exceeds the threshold required for it to become conductive, conducts and discharges capacitor 184.

The voltage of the sawtooth waveform, which is generated by the charging and discharging of capacitor 184, is applied to the base of transistor 178. Whenever the amplitude of the capacitor voltage exceeds the amplitude of the emitter bias voltage applied to transistor 178, within the period of the relaxation oscillation, transistor 178 renders transistor 186 conductive, enabling it to apply its collector voltage to a Schmitt trigger circuit, comprised of transistor 194 and 196, and their associated circuitry.

The output of the Schmitt trigger circuit is applied across the primary winding 198T of a transformer 198. The voltage pulse induced in the secondary winding 198S is applied to the gate of the following SCR to turn it on. Each time the bias is removed from the base of transistor 194, a Schmitt trigger circuit is reset. Each time the Schmitt trigger circuit, comprised of transistors 194 and 196 is reset, the reset output is applied from the collector of transistor 196 to the base of a transistor 200. Transistor 200 drives a second Schmitt trigger circuit comprised of transistors 202 and 204, and their associated circuitry. The output of transistor 204, is applied to the primary winding 206P of a transformer 206. The voltage pulse induced in the secondary winding 198S is applied to the gate of the following SCR which turns off the previously turned-on SCR.

To summarize the operation of the circuit described, when the comparator circuit 24 determines that a motor should be driven in the accelerate mode, that is, current should be applied thereto, then, transistor 122A is enabled whereby operating potential can be applied to the pulse width modulator circuit 26. The control signal, derived by combining the accelerate and speed representative signals and the terrain signal are applied to a transistor 186 which compares the amplitude of this signal with the amplitude of a sawtooth waveform. Whenever a sawtooth waveform voltage exceeds the amplitude of the control signal voltage, a Schmitt trigger circuit is driven from its reset to its set state and stays in its set state until the sawtooth waveform voltage amplitude drops below that of the control signal. The Schmitt trigger output is applied to the primary winding 198P of the transformer whose secondary winding 198S is used to drive an SCR as will be shown subsequently. When the Schmitt trigger circuit is reset, its reset output is used to drive a second Schmitt trigger circuit whose output is applied across the primary winding 206P of a second transformer. The second transformer output drives another SCR which turns off the first SCR.

Figure 4:
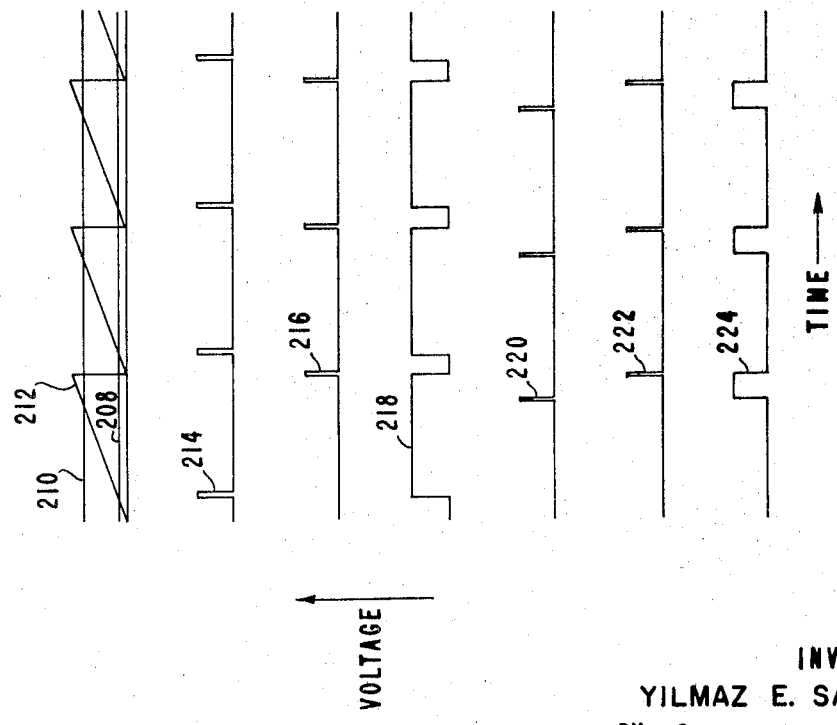
FIG. 4 is a waveform diagram shown to assist in an understanding of an operation of the pulse width modulator.

FIG. 4—Waveform Diagrams

FIG. 4 is a waveform diagram indicative of the results achieved with the pulse width modulation system described. It should be noted, that the transformer 198 is used to apply a drive signal of the SCR which applies drive current to the drive motor and the transformer 206 is used to apply a drive signal to turn off this SCR. Therefore, the conduction duration of the SCR is determined by the interval between the pulse to transformer 198 and the pulse to on transformer 206.

Referring now to FIG. 4, two conditions of the command signal amplitude are assumed. The first amplitude level designated by the waveform 208, which will result in an 85 percent conduction interval for the SCR, and a second waveform amplitude level 210 for the command signal, which results in a 15 percent conduction interval for the SCR. The sawtooth waveform is represented by the waveform 212.

When the sawtooth waveform exceeds the amplitude of the waveform 208, a pulse represented by the waveform 214, is received on the secondary winding 198S. Of course, these pulses recur each time a sawtooth waveform 212 starts anew. When the sawtooth waveform drops below the amplitude of waveform 208, the second Schmitt trigger circuit is actuated resulting in a pulse output at the secondary winding 206S.

In view of the fact that the motor driving SCR is enabled in the interval between pulse waveform 214 and 216, the waveform 218 represents the conduction duration of the motor driving SCR.

On the assumption that the amplitude of the control signal applied to transistor 170 is represented by that of waveform 210, a pulse 220, is derived from a secondary winding 198S at the time that the sawtooth waveform exceeds the amplitude 212. Shortly thereafter, the waveform 222 is derived from the secondary winding 206S. As a result, the conduction duration of the motor drive SCR, as represented by waveform 224, is much shorter than that of waveform 218. Waveform 218 represents an 85 percent conduction interval of a full conduction cycle of the SCR, and waveform 224 represents a 15 percent conduction interval of the full conduction cycle of an SCR.

Figure 5:
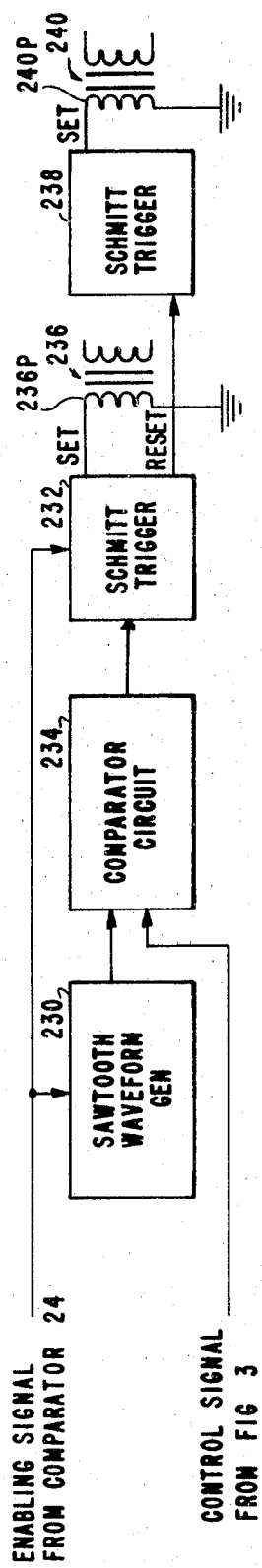
FIG. 5 is a block diagram of a pulse generator circuit which may be used with this invention.

FIG. 5—Pulse Width Modulator 32

FIG. 5 is a block schematic diagram of the pulse width modulator circuit 32 which is used for the purpose of turning on and turning off SCR's whereby the back e.m.f. from the armature of the motor being used for driving the vehicle is chopped so that it can be stepped up and applied for recharging the battery. The pulse width modulator circuit comprises a sawtooth waveform generator 230, a first Schmitt trigger circuit 232 which is driven each time the sawtooth waveform generator output exceeds the control signal amplitude, as determined by a comparator circuit 234. In FIG. 3, the comparator circuit function is accomplished by transistor 178. The set output of the Schmitt trigger 232 drives the primary winding 236P of a transformer 236. The reset output of Schmitt trigger 232 drives a Schmitt trigger circuit 238. The set output of Schmitt trigger 238 drives a primary winding 240P of a transformer 240. It will be appreciated that the sawtooth waveform generator and Schmitt trigger circuit are enabled to operate only in the presence of the enabling signal, comprising the required operating potential, from comparator circuit 24. As may be seen in FIG. 3, this is derived from the junction of the resistor 84A and zener diode 86A. The circuits for the sawtooth waveform generator and the two Schmitt trigger circuits, 232 and 238 have the identical arrangement shown in FIG. 3 for these circuits.

Figure 6:
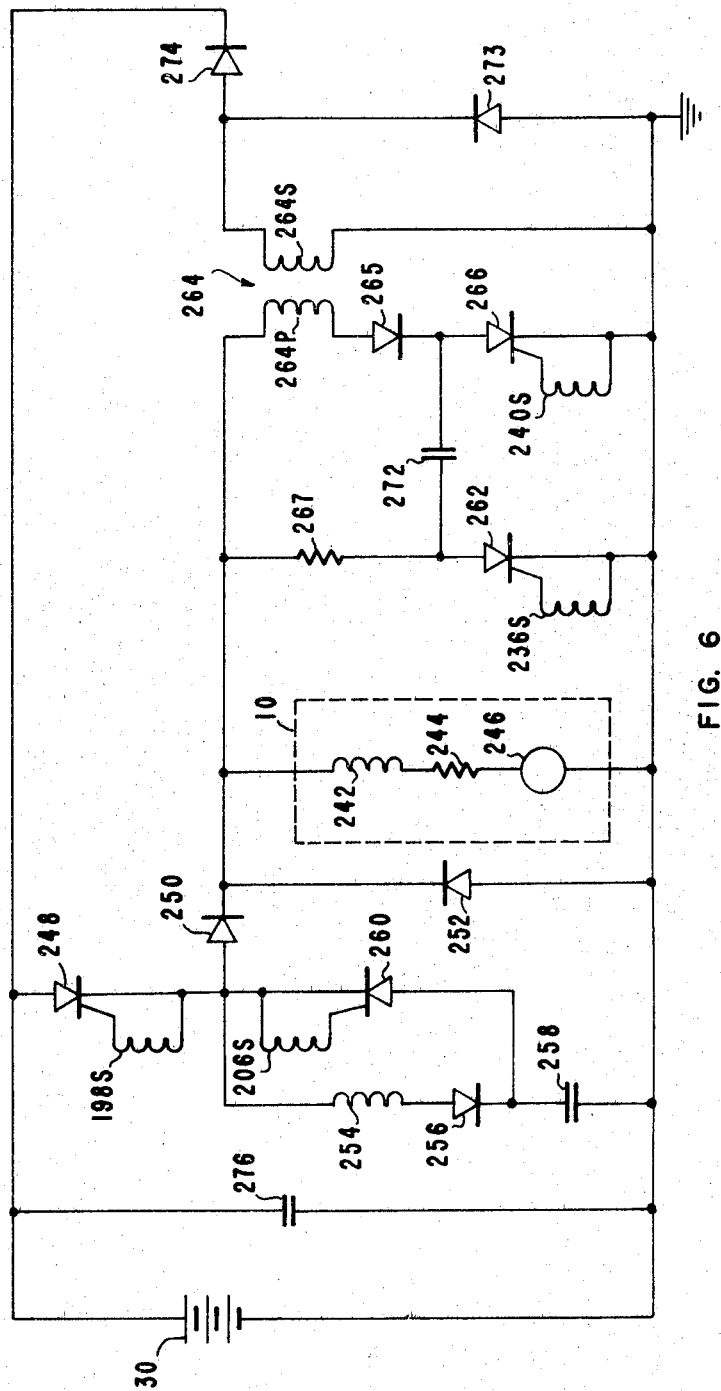
FIG. 6 is a schematic diagram of the motor-operating and battery-charging circuit.

FIG. 6—SCR Circuits for Motor Operation and Battery Charging

FIG. 6 is a schematic diagram of the circuit for applying current to and removing voltage from the motor. An equivalent circuit for the motor 10 is shown, which comprises a series-connected inductance 242, a resistance 244, and a generator 246. The battery 30 is connected to the motor through an SCR 248. The secondary winding 198S is connected between the cathode and gate electrode of this SCR. A diode 250 prevents the resonant commutating circuit from being charged by the motor circuit when the SCR is turned off. Since the pulses applied to the motor are directly related to the instantaneous needs of the drive system, only sufficient power is supplied by the battery to meet such needs, and battery energy is therefore conserved and a minimum amount of battery energy is converted to heat.

Battery power flows to the motor as long as the SCR 248 remains conducting. However, energy is only supplied for discrete periods controlled by the action of the pulse width modulator. However, the current flow in the armature circuit continues during the interval between pulses (other than during complete system shutdown) and is determined by the average voltage appearing across the motor terminals.

A diode 252 is connected across the armature of the motor 10. When the SCR 250 disconnects battery voltage, the existing magnetic fields set up by an inductance 242, begin to collapse, inducing a voltage in the armature which is opposite to that of the battery voltage. This reverse voltage is now applied across diode 252, which is connected so that it will only conduct such reverse voltage, to the armature circuit, causing current to continue flowing therein in the same direction as before until all the energy stored in the collapsing field is consumed. Diode 252 not only produces a more gradual decay of current in the armature circuit during the off portion of the period but also conserves and utilizes energy supplied to the armature circuit during the on portion more efficiently than heretofore. The result is that the torque developed by the armature is not cut off as abruptly between power pulses and this produces smoother armature rotation.

In addition, the low forward resistance of diode 252, while in conduction, tends to suppress any high-voltage transients which would normally be generated by field collapse.

The SCR 248 is turned off by operation of a resonant cathode pulse turnoff circuit made up of an inductance 254, connected in series with a diode 256, which is connected in series with a capacitance 258. The anode of a turnoff SCR 260, is connected to the junction of diode 256 and capacitor 258. The cathode of this turnoff diode 260 is connected to the cathode of SCR 248. A secondary winding 206S is connected between the gate electrode and cathode of SCR 260.

Capacitor 258 charges to approximately twice battery voltage whenever SCR 248 is turned on. When SCR 260 is fired, capacitor 258 discharges through SCR 260 thereby applying a reverse potential to the cathode of SCR 248 and turning it off. SCR 260 turns off when current ceases to flow from SCR 248.

Whenever minimum demand is made on the energy source or battery, due to vehicle operating conditions, such as when coasting or going downhill, the kinetic energy stored in the moving vehicle is utilized to recharge the battery and to simultaneously provide a regenerative braking system for controlling vehicle speed.

The rotating armature always generates a back e.m.f. whose magnitude varies depending upon speed of operation. Ordinarily, it is not available for recharging a battery because it cannot be separated from the average battery voltage when the motor is operating in the motoring mode, but whenever the back e.m.f. exceeds the average battery supplied voltage, energy can be recovered. Ordinarily this back e.m.f. does not reach a level at which it would be high enough to recharge the battery if applied directly thereto.

In order to utilize the energy thus developed, it is necessary to raise the voltage of the back e.m.f. The armature of the motor 10 is connected to the primary winding 264P of a step-up transformer 264. The primary winding is connected in series with a diode 265. The diode 265 is in series with an SCR 266. The gate of SCR 266 is connected to secondary winding 240S. Also, connected across the armature winding of the motor is a resistor 267 in series with an SCR 262. Primary winding 236S is connected to the gate electrode of SCR 262. A capacitor 272 is connected between diode 265 and SCR 262.

The turn on of SCR 262 enables current flow through resistor 267 and the SCR 262 as well as through primary winding 264P, diode 265, capacitor 272 and SCR 262. Capacitor 272 charges up. Turn on of SCR 266 applies capacitor 272 reverse voltage across SCR 262 turning it off. Capacitor 272 then charges up in reverse through resistor 267 and SCR 266. There is also a larger current flow through primary winding 264P than there was when SCR 262 was on. The turn on of SCR 266 really enables the battery 30 to be charged. When SCR 262 is next turned on the capacitor 272 voltage is applied across SCR 266 and turns it off.

When instantaneous terrain characteristic and throttle position (desired vehicle speed) indicate a coasting and/or regenerative braking operation of the motor, the back e.m.f. produced by the motor 10 is pulse modulated by SCR 266, which is turned on by pulses received from the pulse width modulator circuit. It should be appreciated that the duration of the conduction of the SCR is determined by the control signal. The amplitude of the signal applied across the SCR is varied in accordance with the variations of the motor speed. In any event, the SCR's provide a voltage chopping function whereby the step-up transformer 264 can step up this voltage to a value that can be used to charge the battery. The secondary winding 264S is connected in series with a rectifier 274 serves to rectify the stepped-up voltage for application to the battery for recharging purposes. Rectifier 273 which is connected across the secondary winding, dissipates the inductive energy during the turn off of SCR 262. Rectifier 274 just isolates the battery and secondary winding of step-up transformer.

Capacitor 272 is charged up in the same manner as capacitor 258 is charged up however, the voltage level thereacross is twice the back e.m.f. voltage. When SCR 266 is turned on capacitor 272 discharges through this SCR thereby blocking SCR 262.

Control of the duration of the on and off portions of the cycle of operation of SCR 262 varies the energy input to the primary winding 264P of the step-up transformer and accordingly the amount of energy returned to the battery. This winding also serves as a load for regenerative braking and the duration of the connection through SCR 262 to the winding determines the braking period as well as the recharging period. Since this is controlled by the sensing and pulse width modulator circuits, the management provided by the system produces maximum utilization of the potentially available kinetic energy. Capacitor 276 serves as a filter for the rectified current and simultaneously suppresses transients which may be developed by the SCR switching actions.

Diode 273 serves a free wheeling function, similar to that of diode 252 for the step-up transformer, prevents high-voltage transients when SCR₃ is off. It also serves to prevent development of extremely high voltage across transformer primary 264P when the SCR 262 is switched off.

There has accordingly been described hereinabove a novel, useful and unique system for controlling the electrical drive of a vehicle in a manner to use only the energy required for propelling the vehicle and utilizing any kinetic energy developed by the vehicle for recharging the battery used as the energy source.

What is claimed is:

1. In a vehicle driven over terrain by an electrical motor which receives power from a battery under control of a throttle, the improvement comprising:
   means for establishing a throttle voltage in response to the setting of the throttle representative of the desired vehicle speed,
   tachometer means driven by said electrical motor for generating a tachometer voltage representative of the actual speed of said vehicle,
   slope sensing means for establishing a terrain voltage representative of the terrain slope,
   means to which said throttle, tachometer and terrain voltages are applied for establishing a control voltage representative of the control effect required to attain the speed specified by said throttle setting,
   means for comparing said control voltage with said tachometer voltage for establishing a motor drive signal when said control voltage exceeds said tachometer voltage and for producing a regenerative signal when said tachometer voltage exceeds said control voltage,
   means enabled responsive to said motor drive signal for applying current from said battery to said electric motor in an amount determined by said control signal, and
   means enabled responsive to said regenerative signal for applying charging voltage from said electric motor to said battery in an amount determined by said control signal.

2. In a vehicle as recited in claim 1 wherein said means for establishing a control voltage comprises means for comparing said throttle and tachometer voltages to derive a difference voltage representing the difference thereof and to establish an acceleration signal when said throttle voltage exceeds said tachometer voltage and a deceleration signal when said tachometer voltage exceeds said throttle voltage,
   means responsive to said deceleration signal for subtracting said difference voltage from said tachometer voltage to provide a first resultant voltage,
   means for combining said terrain voltage with said first resultant voltage to provide a deceleration mode control voltage,
   means responsive to said acceleration signal for adding said difference voltage with said tachometer voltage to provide a second resultant voltage, and
   means for combining said terrain voltage with said second resultant voltage to produce an accelerate mode control voltage.

3. In a vehicle as recited in claim 1 wherein said means enabled responsive to said motor drive signal for applying current to said motor in an amount determined by said control signal comprises a first circuit means for generating a first pulse followed after an interval determined by the amplitude of said control voltage by a second pulse,
   first silicon control rectifier means coupling said battery to said electric motor, and
   means to which said first and second pulses are applied for enabling said first silicon control rectifier means to conduct over the interval between said first and second pulses,
   said means enabled responsive to said regenerative signal for applying charging voltage from said electric motor to said battery in an amount determined by said control voltage comprises:
   a second circuit means for generating a third pulse followed after an interval determined by the amplitude of said control voltage by a fourth pulse,
   a step-up transformer having an input and output,
   second silicon control rectifier means coupling said electric motor to said step-up transformer input,
   rectifier means coupling said step-up transformer output to said battery,
   means to which said third and fourth pulses are applied for enabling said second rectifier means to conduct over the interval between said third and fourth pulses.

4. In a vehicle as recited in claim 3 wherein said first circuit means for generating a first pulse followed after an interval determined by the amplitude of said control voltage by a second pulse comprises a first sawtooth waveform generator,
a first and a second Schmitt trigger circuit each having a set and reset state circuit means to which said control voltage and the output of said sawtooth waveform generator are applied for driving said first Schmitt trigger circuit from its reset to its set state only while said sawtooth waveform voltage exceeds said control voltage,
means for driving said second Schmitt trigger circuit from its reset to its set state responsive to the output of said first Schmitt trigger circuit going from its set to its reset state, and
first and second transformer means respectively coupling said first and second Schmitt trigger circuits to said first silicon control rectifier means.

5. In a vehicle as recited in claim 3 wherein said second circuit means for generating a third pulse followed after an interval determined by the amplitude of said control voltage by a fourth pulse comprises:
a second sawtooth generator,
a third and fourth Schmitt trigger circuit each having a set and a reset state,
circuit means to which the control voltage and the output of said sawtooth waveform generator are applied for driving said third Schmitt trigger circuit from its reset to its set state only while said sawtooth waveform exceeds said control voltage,
means for driving said fourth Schmitt trigger circuit from its reset to its set state responsive to the output of said third Schmitt trigger circuit going from its set to its reset state, and
third and fourth transformer means respectively coupling said third and fourth Schmitt trigger circuits to said second silicon control rectifier means.

6. In a vehicle drive system wherein an electrical motor is driven from a battery under the control of a throttle for driving said vehicle over terrain, the improvement comprising:
means for establishing a voltage in response to the setting of the throttle representative of a desired speed,
tachometer means driven by said motor for generating a voltage representative of the actual speed of said motor,
slope sensing means for establishing a voltage representative of the terrain slope,
combining means to which said slope sensing means throttle and tachometer means voltages are applied for establishing a control voltage representative of the control effect required to attain the speed specified by the setting of said throttle,
comparator means to which said control voltage and said tachometer means voltage are applied for producing a motor drive indicating signal when said control voltage exceeds said speed tachometer means voltage and for producing a regenerative signal when said tachometer means voltage exceeds said control voltage,
first pulse width modulating means energized response to said motor drive signal and to which said control voltage is applied for producing a succession of first and second pulses wherein the interval between a first and a succeeding second pulse is varied in response to said control signal,
second pulse width modulating means energized responsive to said regenerative signal and to which said control signal is applied for producing a succession of first and second pulses wherein the interval a first and a succeeding second pulse is varied in response to said control signal,
first silicon control rectifier means coupling said battery to said motor,
means for applying said pulse width modulated means output to said first silicon control rectifier means for enabling current flow therethrough during the interval between each first and succeeding second pulse,
second silicon-controlled rectifier means coupling said motor to said battery, and
means for applying said second pulse width modulated means output to said second silicon control rectifier means for enabling it to apply voltage received from said motor to said battery during the interval between each second and succeeding first pulse.

7. Apparatus as recited in claim 6 wherein said combining means includes:
a first Schmitt trigger circuit,
means for establishing a difference signal representative of the difference between said tachometer means voltage and said throttle setting voltage,
means responsive to said difference signal indicating that said tachometer means voltage exceeds the amplitude of said throttle setting voltage for driving said first Schmitt trigger circuit to its set state,
first transistor means enabled responsive to the set state output of said first Schmitt trigger circuit,
means for applying said tachometer means voltage to said first transistor means,
means for applying said difference voltage to said first transistor means for reducing the throttle speed means voltage amplitude in response thereto,
means for combining said terrain slope voltage with the output of said first transistor means to provide a control signal representative of deceleration.

8. Apparatus as recited in claim 7 wherein there is included a second Schmitt trigger circuit,
means responsive to said difference signal voltage indicating that the throttle setting representative voltage amplitude exceeds the tachometer means voltage amplitude for driving said second Schmitt trigger circuit to its set state,
a second transistor means enabled responsive to said set state output of said second Schmitt trigger circuit,
means for applying said difference voltage to said second transistor means,
means for adding the output of said second transistor means to said speed representative voltage, and
means for combining the output of said second transistor means with said terrain slope voltage to provide a control voltage indicative of the requirement for an acceleration.

9. Apparatus as recited in claim 6 wherein said means to which said tachometer means voltage and said control voltage are applied for generating a motor signal or a regenerative signal includes a second difference circuit,
means for applying said tachometer means voltage and said control voltage to said second difference circuit for producing a voltage representative of the difference therebetween,
a third Schmitt trigger circuit and a fourth Schmitt trigger circuit,
means responsive to the output of said second difference circuit indicating that said control voltage amplitude is larger than said tachometer means voltage amplitude for driving said third Schmitt trigger circuit to its set state whereby the output of said third Schmitt trigger circuit in its set state represents a motor drive indicating signal, and
means for applying the output of said difference circuit to said fourth Schmitt trigger circuit for driving it to its set state when said difference circuit output represents that the amplitude of said tachometer means voltage exceeds the amplitude of said control voltage whereby the output of said fourth Schmitt trigger circuit in its set state represents a regenerative signal.

10. Apparatus as recited in claim 6 wherein said first pulse width modulator means comprises a first sawtooth generator,
a fifth Schmitt trigger circuit,
a sixth Schmitt trigger circuit,
means to which said control voltage and said first sawtooth waveform generator output are applied for driving said fifth Schmitt trigger circuit to its set state over the interval during which said sawtooth waveform generator output amplitude exceeds the amplitude of said control signal, whereby said fifth Schmitt trigger circuit produces a first pulse, and means for driving said sixth Schmitt trigger circuit from the reset output of said fifth Schmitt trigger circuit whereby said sixth Schmitt trigger circuit produces a second output pulse.

11. Apparatus as recited in claim 10 wherein said first silicon-controlled rectifier means includes a first silicon control rectifier, first transformer means for applying said fifth Schmitt trigger first output pulse to said first silicon control rectifier for causing it to become conductive whereby current is applied from said battery to said motor, and second transformer means to which said fifth Schmitt trigger circuit second output pulse is applied for disenabling said first silicon control rectifier whereby current flow from the battery to the motor is terminated.

12. Apparatus as recited in claim 6 wherein said second pulse width modulator means comprises:

a second sawtooth waveform generator, a seventh and an eighth Schmitt trigger circuit, means to which said control voltage and said second sawtooth waveform generator voltage are applied for driving said seventh Schmitt trigger circuit to its set state responsive to said sawtooth waveform voltage amplitude exceeding said control voltage amplitude, whereby a said seventh Schmitt trigger circuit is driven to its set state to produce a third output pulse, means responsive to said seventh Schmitt trigger circuit returning from its set to its reset state for driving said eighth Schmitt trigger circuit to its set state whereby a fourth output pulse is generated.

13. Apparatus as recited in claim 12 wherein said second silicon control rectifier means includes a second silicon control rectifier, step-up transformer means coupling said second silicon control rectifier to said battery, means coupling said motor to said second silicon control rectifier, means for applying said third output pulse to said second silicon control rectifier to enable it to apply current from said motor to said step-up transformer, and means responsive to said fourth output pulse for rendering said second silicon control rectifier inoperative.

14. The method of controlling a vehicle speed moving over a terrain wherein the vehicle drive system includes an electrical motor driven from a battery at a speed determined by a throttle setting comprising:

establishing a tachometer voltage representative of said vehicle speed, establishing a throttle voltage representative of a throttle setting, establishing a terrain voltage representative of terrain slope, combining said tachometer, throttle and terrain voltages to provide a control voltage, comparing said control voltage with said tachometer voltage to establish either a motoring mode signal or a regenerative mode signal, applying current from said battery to said motor responsive to said motoring mode signal in an amount determined by said control signal, and applying voltage from said motor to said battery responsive to said regenerative mode signal in an amount determined by said control signal.

* * * * *